(12) United States Patent
Cruckshank

(10) Patent No.: US 11,673,458 B2
(45) Date of Patent: Jun. 13, 2023

(54) FOLDING BI-PANEL CARGO BED COVER AND PICK-UP TRUCK RACK

(71) Applicant: Lindsay Cruckshank, Sebastopol, CA (US)

(72) Inventor: Lindsay Cruckshank, Sebastopol, CA (US)

(*) Notice: Subject to any disclaimer, the term of this patent is extended or adjusted under 35 U.S.C. 154(b) by 5 days.

(21) Appl. No.: 17/648,875

(22) Filed: Jan. 25, 2022

(65) Prior Publication Data
US 2022/0242211 A1   Aug. 4, 2022

Related U.S. Application Data

(60) Provisional application No. 63/199,870, filed on Jan. 29, 2021.

(51) Int. Cl.
*B60J 7/14* (2006.01)
*B60J 7/16* (2006.01)

(52) U.S. Cl.
CPC ............. *B60J 7/141* (2013.01); *B60J 7/1607* (2013.01); *B60J 7/1621* (2013.01)

(58) Field of Classification Search
CPC ....... B60J 7/14; B60J 7/141; B60J 7/16; B60J 7/1607; B60J 7/1621; B60J 7/148
USPC ......... 296/3, 100.01, 100.02, 100.06, 100.07
See application file for complete search history.

(56) References Cited

U.S. PATENT DOCUMENTS

| | | | | |
|---|---|---|---|---|
| 3,841,690 A * | 10/1974 | Piercy | ...................... | B60P 3/42 296/13 |
| 4,531,775 A * | 7/1985 | Beals | ........................ | B60P 7/00 296/100.06 |
| 5,009,457 A * | 4/1991 | Hall | ......................... | B60J 7/141 296/3 |
| 6,224,140 B1 * | 5/2001 | Hoplock | .................... | B60J 7/10 296/100.18 |
| 6,607,229 B1 * | 8/2003 | McIntosh | ............... | B62D 33/00 296/26.06 |
| 7,246,839 B1 * | 7/2007 | Nyberg | ....................... | B60J 7/11 296/100.06 |
| 8,794,690 B1 * | 8/2014 | Al-Saeed | ................ | B60J 7/1621 296/100.1 |
| 9,713,950 B1 * | 7/2017 | Stoddard, Jr. | .......... | B60J 7/1621 |
| 10,759,479 B2 * | 9/2020 | Fisher | .................. | B62D 33/027 |
| 2002/0149219 A1 * | 10/2002 | Rios | ........................ | B60J 7/1621 296/26.06 |
| 2015/0197141 A1 * | 7/2015 | Cortez | ...................... | B60J 7/141 296/3 |

* cited by examiner

*Primary Examiner* — Jason S Daniels

(57) ABSTRACT

A cargo bed cover and rack for a pick-up truck cargo bed, including left and right folding panels having hinges configured to attach to the top rails of a pick-up truck cargo bed, a front crossbar member configured to attach to a fore portion of the truck cargo bed immediately behind the truck cab, a rear crossbar member configured to attach to a rear portion of the truck cargo bed proximate the tail gate, and latching mechanism disposed on the left and right folding panels configured to secure and selectively lock the panels in a cargo compartment storage configuration, and locking structure on at least one of the crossbar members that cooperate with the latching mechanisms to lock the folding panels in a generally upright position to achieve an expanded cargo compartment configuration.

20 Claims, 13 Drawing Sheets

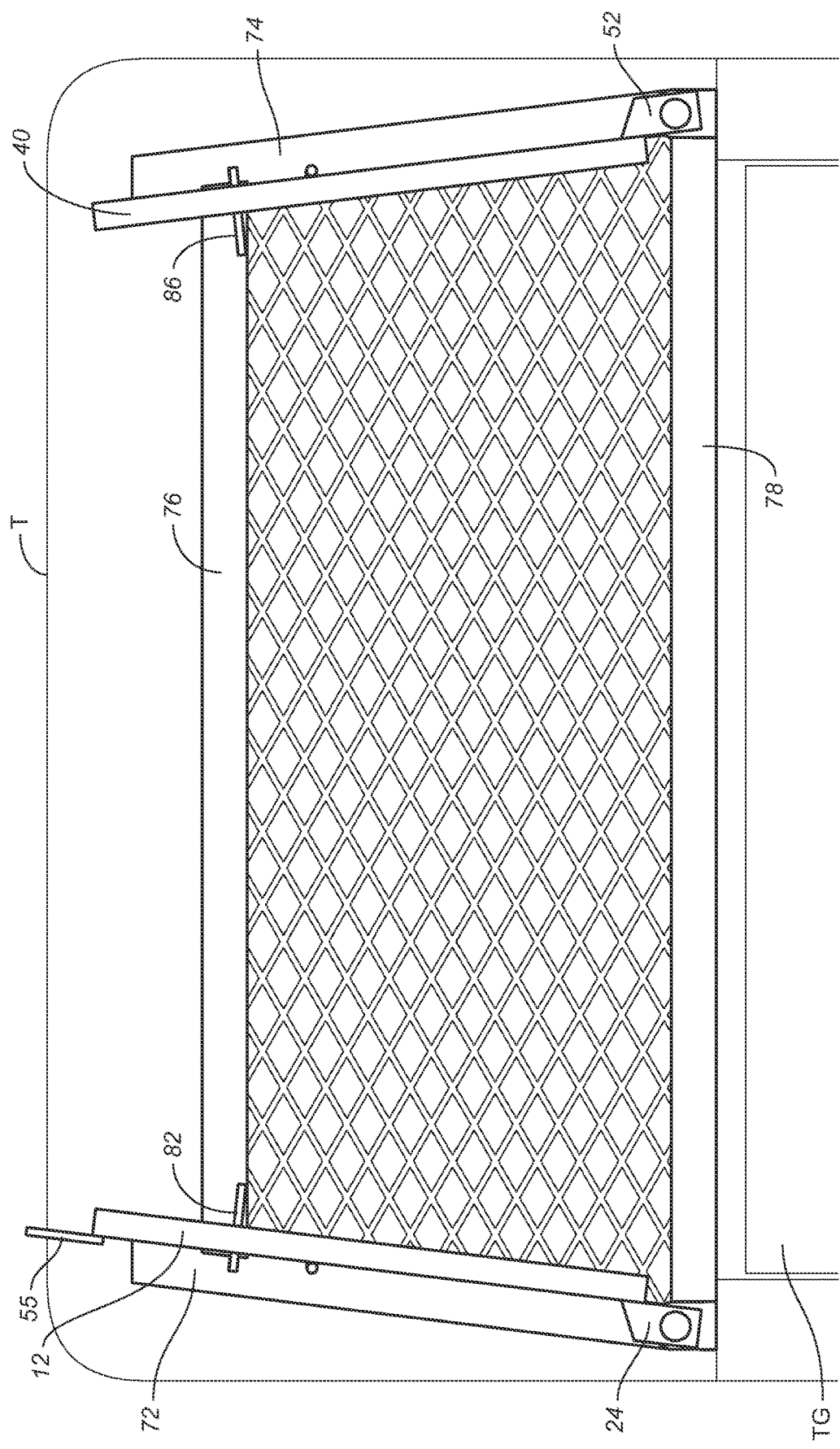

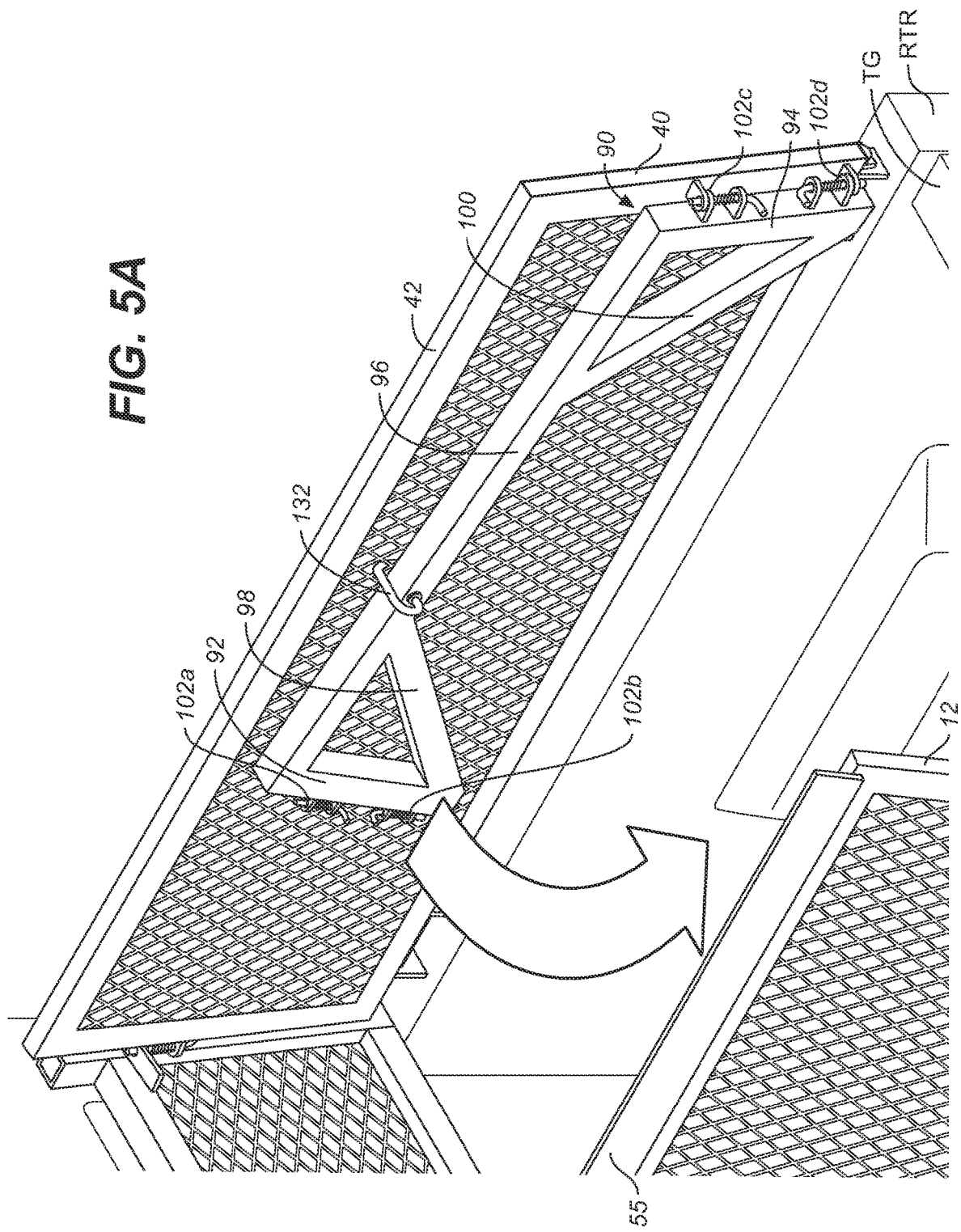

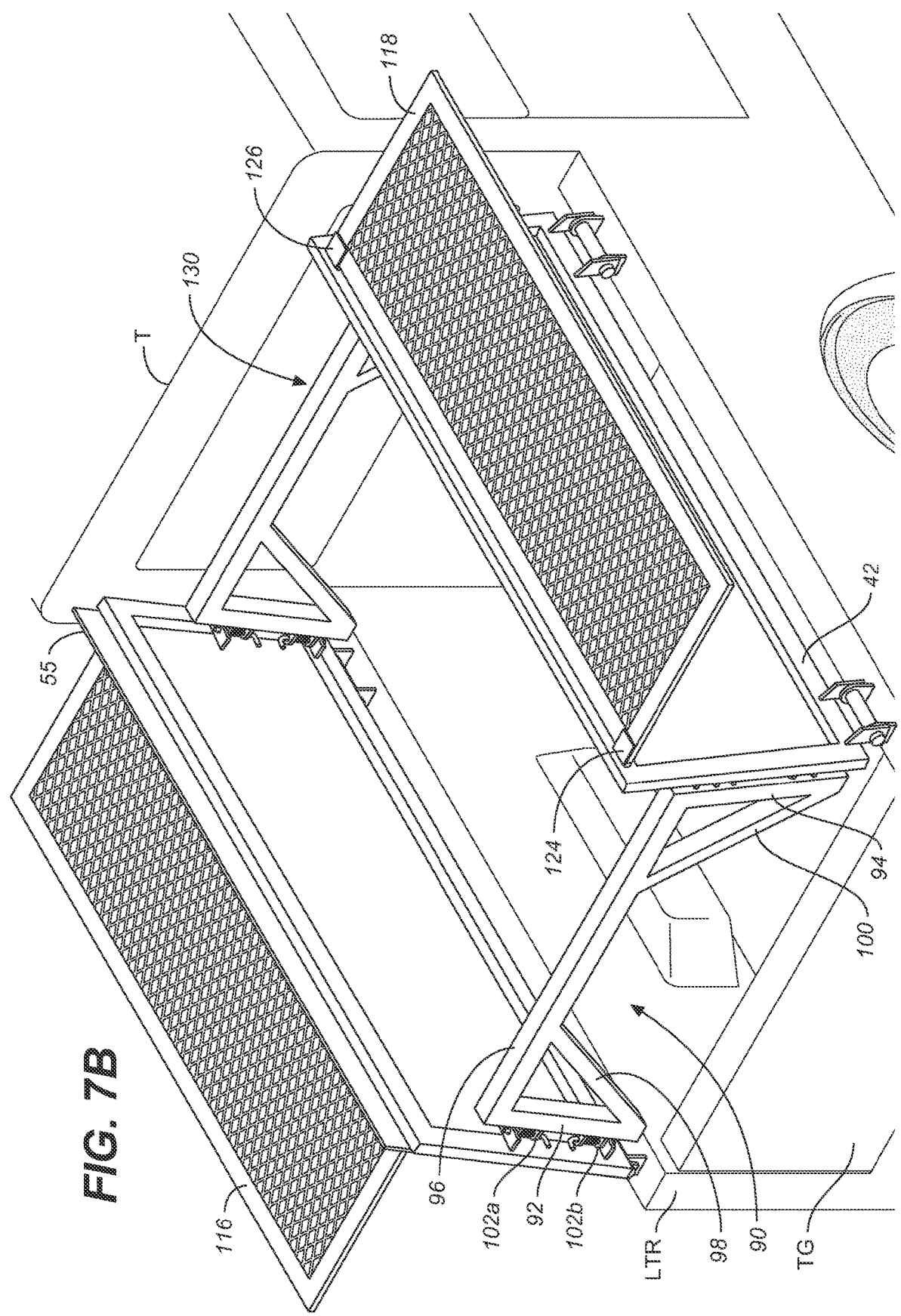

FOLDING BI-PANEL CARGO BED COVER AND PICK-UP TRUCK RACK

CROSS REFERENCES TO RELATED APPLICATIONS

The present application claims the benefit of the filing date of U.S. Provisional Patent Application Ser. No. 63/199,870, filed 29 Jan. 2021, which application is incorporated in its entirety herein.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention: The invention relates most generally to equipment racks for fleetside, styleside, stepside, flareside, and utility bed pickup trucks, and more particularly to a folding bi-panel cargo bed cover and rack having a storage cover configuration and an expanded storage compartment configuration.

Background Discussion: Utility and equipment racks, as well as tonneau covers for trucks are well known. Myriad designs and configurations are adapted for very specific purposes, such as carrying elongate materials, such as lumber or pipes, as well as for general use in carrying and supporting numerous articles. Over the cab racks mount atop the beds of pickup trucks and include an extended portion ("over the cab") to carry long objects such as uncut lumber, rebar, pipe, ladders, scaffolding, kayaks, canoes, etc. The over-the-cab portion helps to prevent significant lengths of carried objects from extending dangerously rearward from the pickup truck bed.

Despite the maturity and popularity of this structural technology, there remains a need for an improved rack and cargo box cover configuration that combines the means to cover cargo contained within the cargo box volume of a pickup truck, while enabling expansion of the container volume using the rack itself. The present invention achieves these objectives, among others.

BRIEF SUMMARY OF THE INVENTION

The present invention is a truck track and cargo bed cover adapted for installation on the cargo bed of nearly any currently marketed conventional pickup truck. In embodiments, once installed, the inventive cover and rack provides both the means to cover a load stored within the volume defined by a pickup cargo bed and the means to expand that volume substantially in a storage compartment configuration. When in a cargo bed storage (or cargo bed cover) configuration, folding panels cover the cargo bed at substantially the level of the top rails of the right and left cargo bed panels and that of the tailgate. The folding panels are configured to pivot up on hinges, in the manner of a door, and then to latch into a locked position with the panels in a generally vertical orientation, thus producing an expanded storage compartment configuration. Front and rear crossbar members provide structural rigidity and support and further define an upper enclosure. The cargo bed volume is thereby substantially increased, and the front and rear crossbar members also provide supports for elongate articles, such as lumber, pipes, ladders, kayaks, and the like.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims included in any non-provisional patent application claiming the benefit of the filing date of the instant application.

BRIEF DESCRIPTION OF SEVERAL VIEWS OF THE DRAWINGS

The invention will be better understood and objects other than those set forth above will become apparent when consideration is given to the following detailed description thereof. Such description makes references to the annexed drawings, briefly described below. Note should be made that because the inventive rack is specifically adapted for installation on motor vehicles, reference to right and left sides correspond to the right and left sides of a passenger compartment as experienced by the vehicle occupants in a vehicle with a steering wheel on the left side. Thus, the passenger side of the vehicle is considered and referred to as the right side, and the driver's side is considered and referred to as the left side.

FIG. 3B is the same rear view in elevation showing the cargo bed cover and rack in the expanded cargo compartment configuration (i.e., with the folding panels pivoted up and secured by the front crossbar frame;

FIG. 5A is an upper left rear perspective view showing an alternative embodiment in which the rear crossbar frame member is pivotally attached to one folding panel and is poised to pivot or swing transversely to provide support for the opposing folding panel;

FIG. 7B is the same view showing the panel doors open to provide access to the interior storage area defined when the folding panels are in the same expanded configuration.

DETAILED DESCRIPTION OF THE INVENTION

Figure 1:
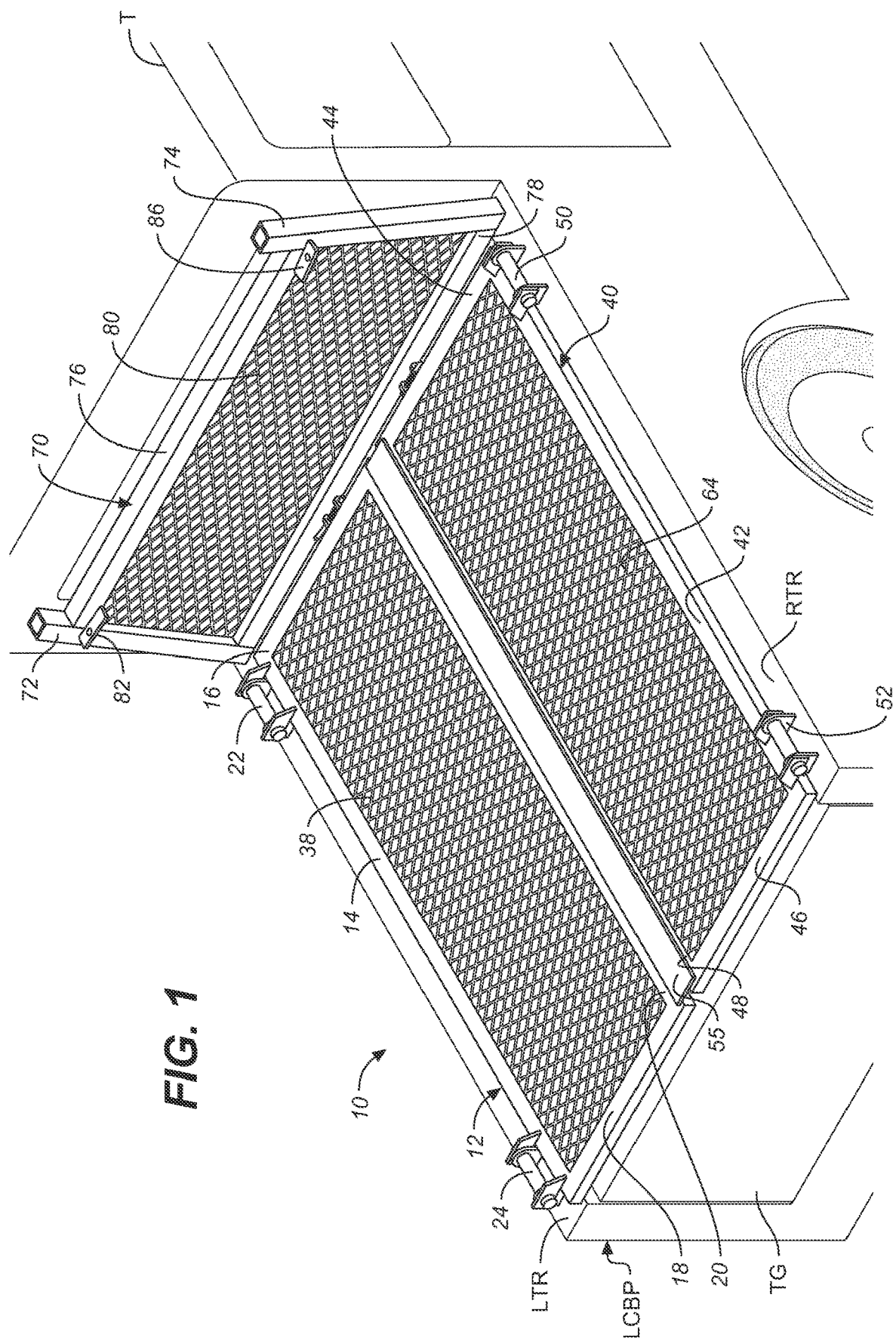
FIG. 1 is an upper right rear perspective view of the folding bi-panel cargo bed and rack of the present invention, this view showing an embodiment as installed on a pickup truck and in a cargo bed cover and storage configuration.
Figure 2:
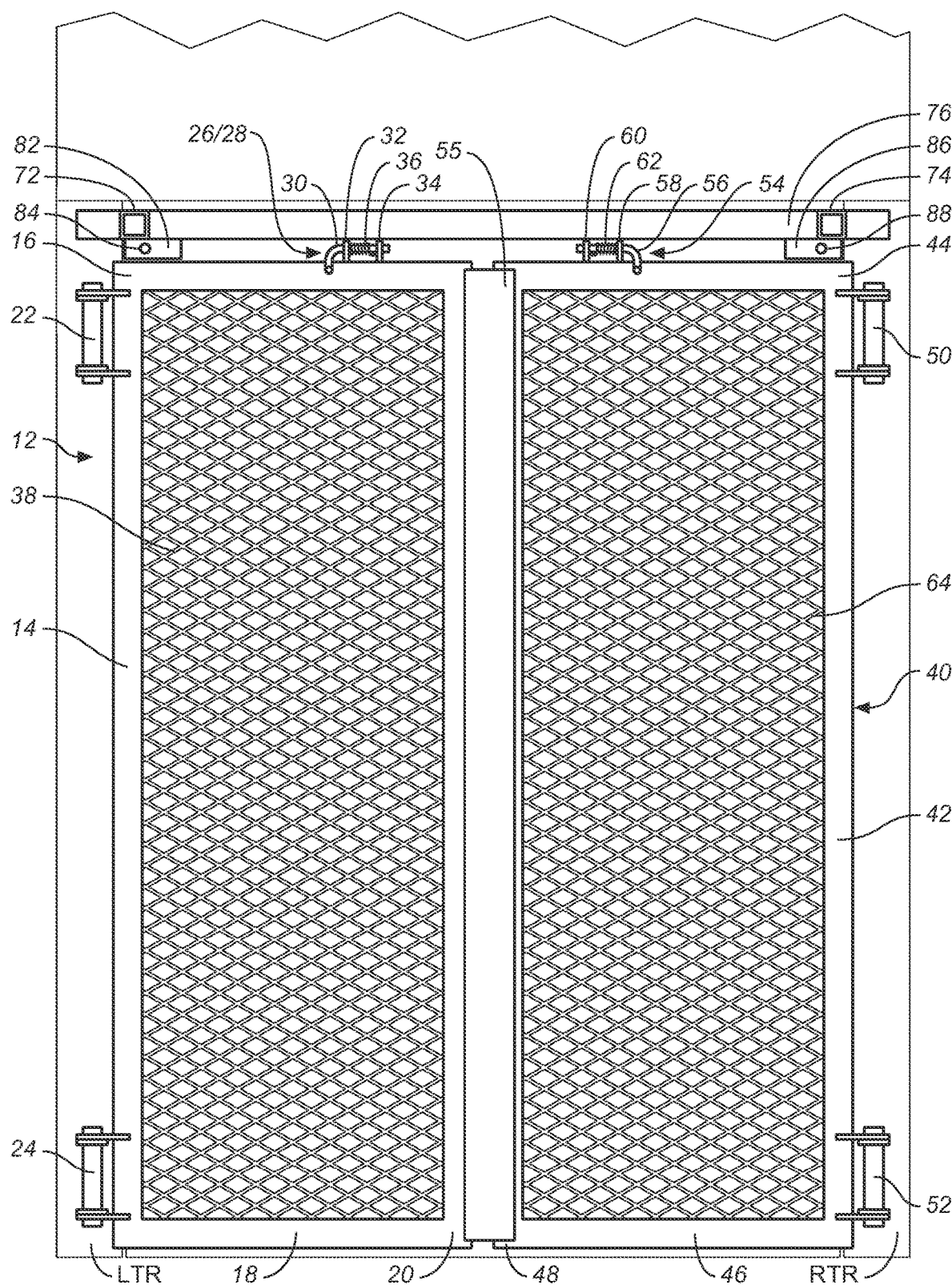
FIG. 2 is a top plan view thereof showing only the two cargo bed cover panels and front crossbar frame member.
Figure 3A:
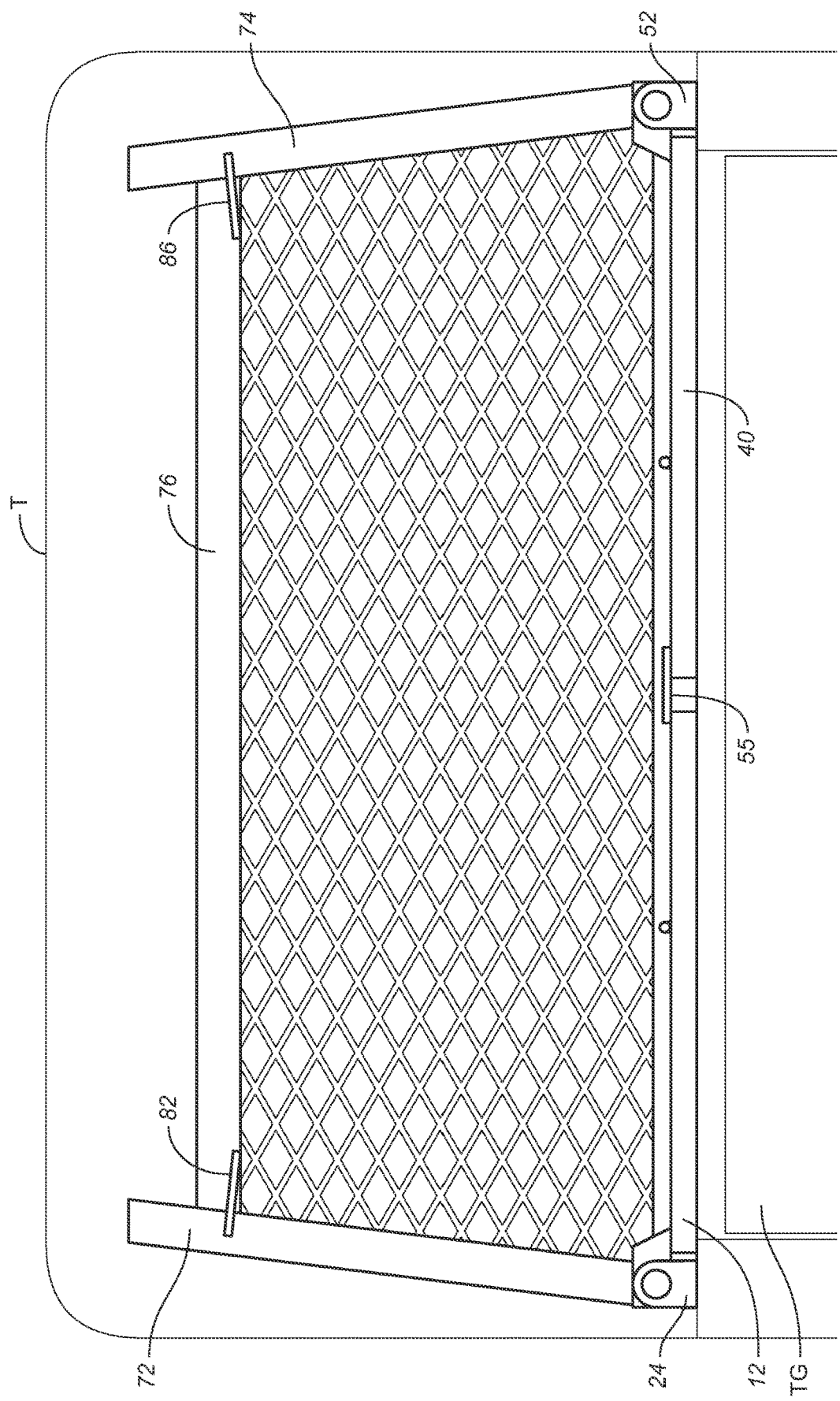
FIG. 3A is a rear view in elevation thereof, showing the invention in the cargo bed cover configuration.
Figure 4A:
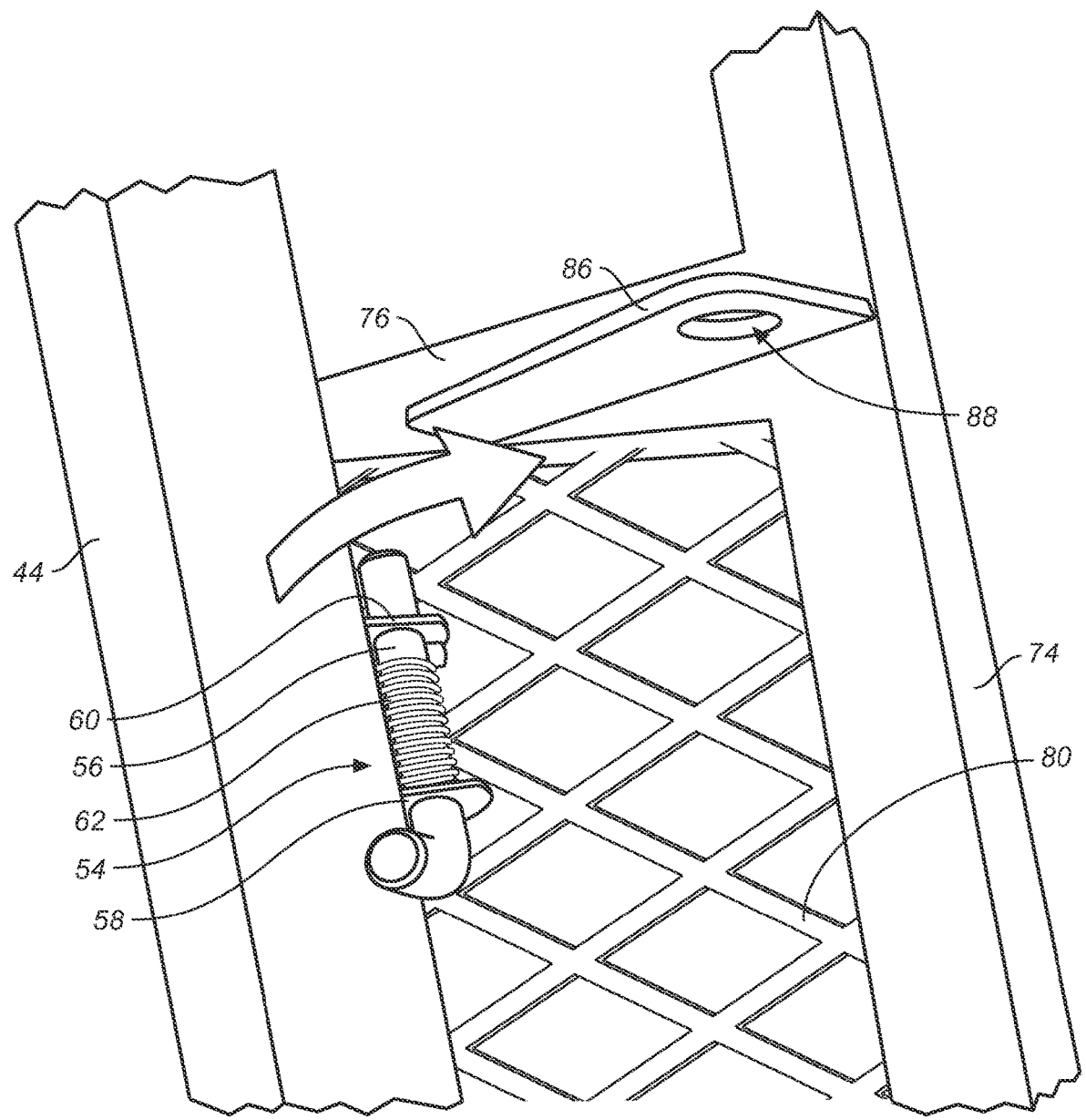
FIG. 4A is a detailed view showing the right folding panel pivoting toward a ramped latch strike plate to go into a locked upright position.
Figure 4B:
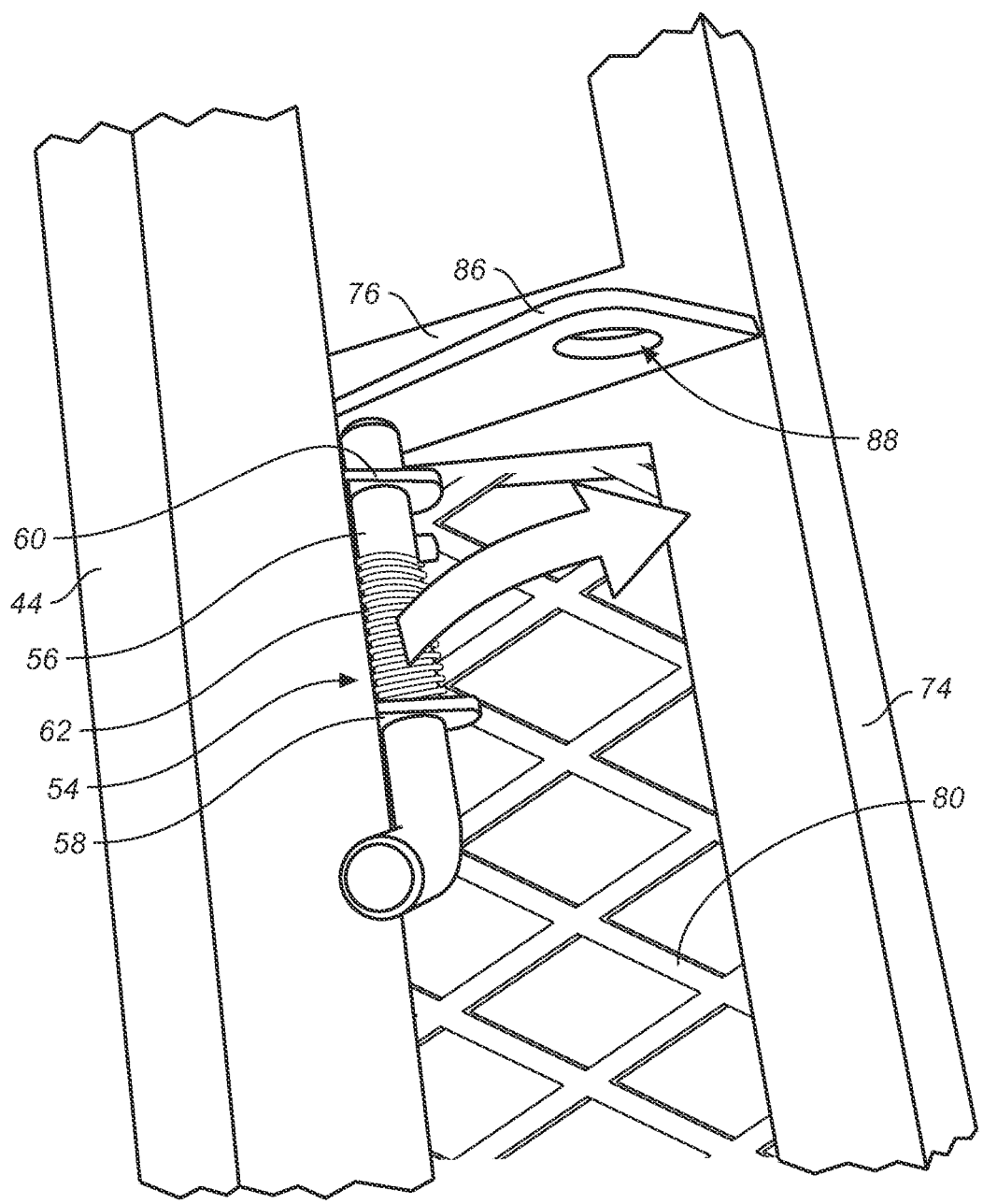
FIG. 4B is the same view showing the spring-biased latch bolt depressing as it progresses along the ramped latch strike plate.
Figure 4C:
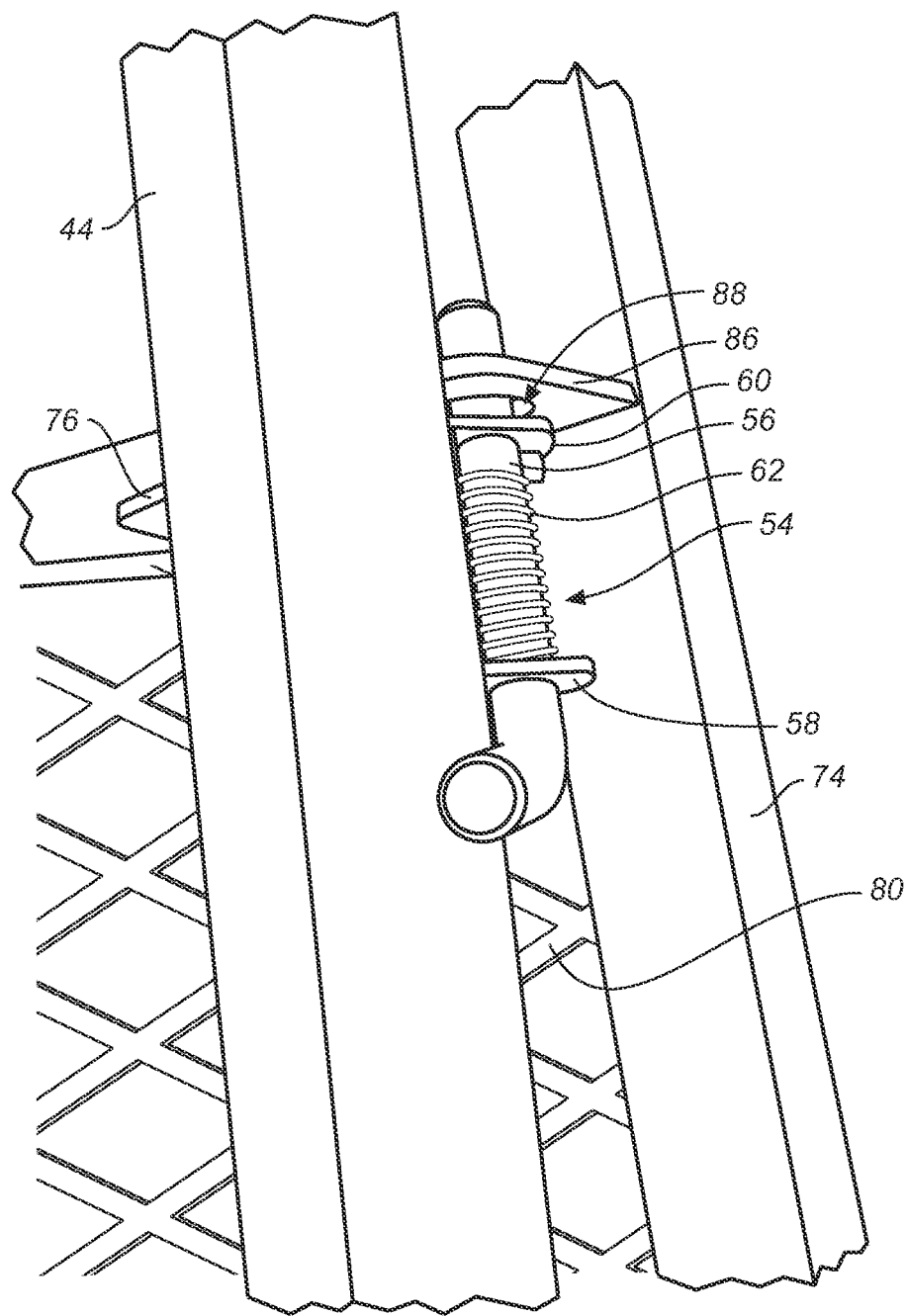
FIG. 4C shows the latch in when the panel is in the fully upright and locked configuration.

Referring to FIGS. 1 through 7B, wherein like reference numerals refer to like components in the various views, there is illustrated therein embodiments of a new and improved folding bi-panel cargo box cover and rack, generally denominated 10 and 100 herein.

Referring first to FIGS. 1-5B collectively, there is shown an embodiment of the inventive folding bi-panel cargo bed cover and rack 10. The rack and cover assembly comprises a generally rectangular left folding panel 12, having a frame that includes a lateral rail (or hinge stile) 14, a front rail (or front stile) 16, a rear rail (or rear stile) 18, and a medial rail (or lock stile) 20. The lateral rail is coupled (typically welded or bolted) to front and rear hinges, 22, 24, each mounted on the left top rail LTR of the left cargo bed panel LCBP of the truck T.

A latching mechanism 26 may be affixed to the front rail 16 of the left folding panel. The mechanism may be any of a number of latching systems, but in embodiments may be a spring-loaded barrel bolt 28 including a locking pin 30 slidingly disposed between spaced-apart integral tabs 32 (which functions as a bolt stabilizing plate), and 34 (which functions as a latch plate), each with aligned bolt holes (not shown), wherein the spring is a helical compression spring 36 axially disposed over the locking pin and positioned between the tabs to urge the pin into a locked/extended position and which allows depression of the pin to enable insertion into the opening in a strike plate (described below). The locking pin may have a curved or looped grip portion.

The rectangular region between the folding panel rails may be a fully open bar frame with no panel material included, partially open with material such as the diamond hole mesh shown 38, or closed with a solid metal, plastic, vinyl, fabric, or other non-mesh material panel. A solid panel may be permanently affixed to the rails or removable. Further, and as discussed more fully below, the panel may itself by attached to the rails with hinges to allow selective opening in both the storage and upright configurations.

Hinges 22, 24, 50 and 52, may be installed and secured to the truck top rails with bolts, clamps, or stave inserts, or combinations thereof.

The assembly next includes a generally rectangular right folding panel 40, generally symmetrical with and structurally identical to the left panel, thus including a frame having a lateral rail 42, a front rail 44, a rear rail 46, and a medial rail 48. Again, the lateral rail is welded or bolted to front and rear hinges 50, 52, each mounted on the right top rail RTR of the right cargo bed panel RCBP of the truck. A spring-loaded barrel bolt 54 is attached to the front rail 44, having the same structural and mechanical elements as the opposing latching mechanism: thus, a locking pin 56 slidingly disposed between spaced-apart integral tabs 58, 60, (the first a bolt stabilizing plate and the second a latch plate, and having aligned bolt holes), and a helical compression spring 62 axially disposed over the locking pin.

One of the folding panels (in the illustrated embodiment, the left panel) further includes a meeting stile 55 which spans any gap between the left and right panels when they are down and in the cargo bed storage configuration, thereby covering the gap while also adding structure to assist in keeping the upper surfaces of the panels in a generally coplanar relationship.

Again, the rectangular region between the rails of the left panel may be a fully open bar frame, metal mesh, or covered with solid or flexible material 64. with no panel material included, partially open with material such as the diamond hole mesh shown, or closed with a solid metal, plastic, vinyl, fabric, or other material panel.

In an embodiment, the assembly next includes a headache rack (which may be characterized as a front crossbar member or truck cab rack) 70. In embodiments, the headache rack/front crossbar member is secured on a forward or fore portion of the cargo bed immediately behind the truck cab window (in a well-known manner). As with many prior art designs, the headache rack includes left and right vertical supports (or legs) 72, 74, an upper crossbar 76, and a lower crossbar 78. As with the left and right folding panels, the headache rack may include a steel mesh (or other material) interior portion 80.

Securely welded to each of the vertical supports at the joint with the upper crossbar are locking elements that cooperate with the latching mechanism disposed on the front rails. In embodiments, this may include a left ramped strike plate 82 having an aperture 84 for insertion of the locking pin, and a right ramped strike plate 86 having a similar aperture 88. Operation of the locking mechanism is illustrated in detail in FIGS. 4A-4C, which shows the cooperation of the spring-loaded barrel bolt and ramped strike plate. As can be seen, when locking pins 30, 56, are pulled to release them from a locked position with the right and left folding panels in the cargo storage configuration (shown in FIGS. 1-2), the folding panels may be pivoted upwardly until the spring-biased locking pins engage their respective ramped strike plates 82, 86, at which point the panels may be rotated until the locking pins insert through their respective lock apertures 84, 88.

Figure 5B:
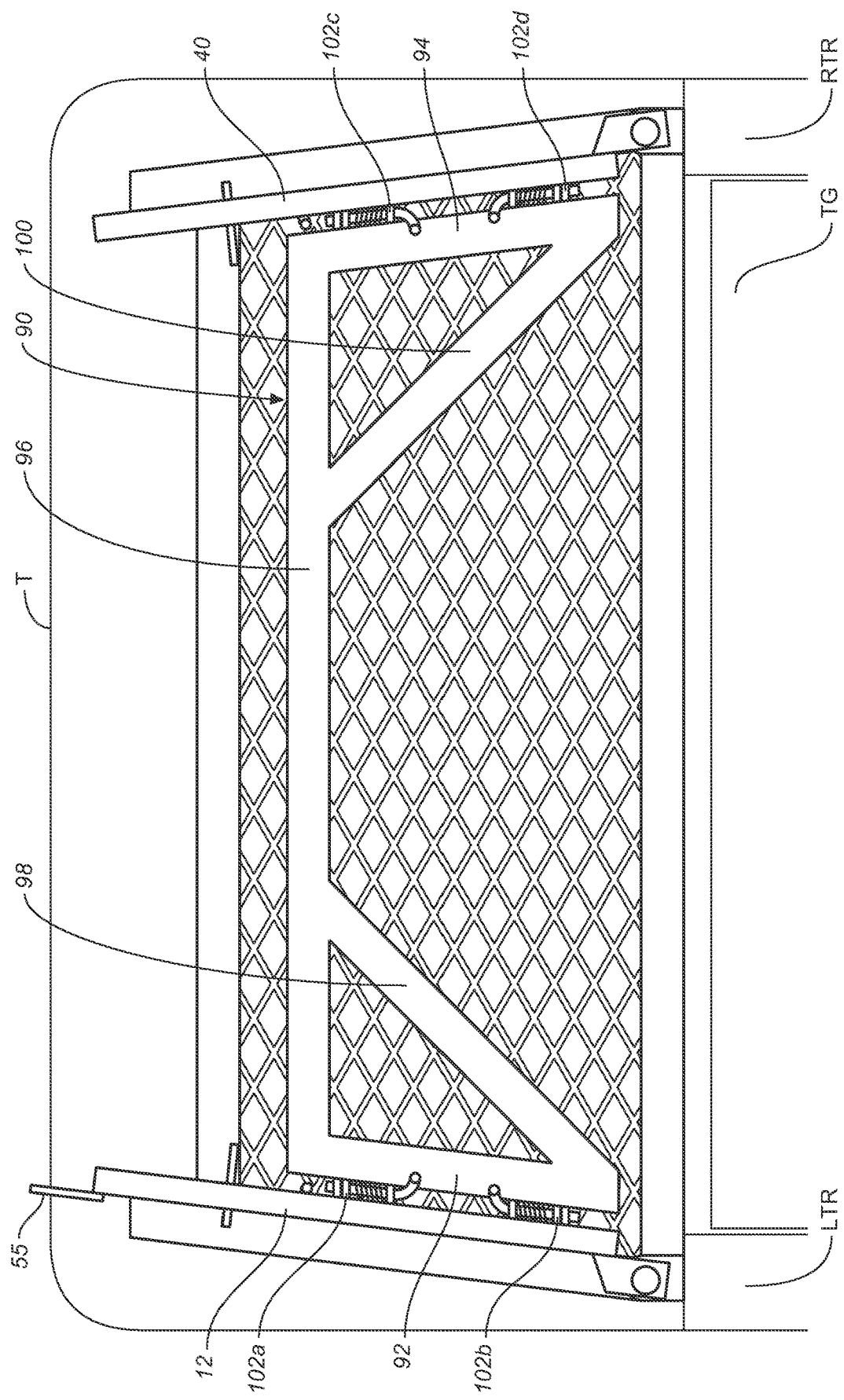
FIG. 5B shows the rear crossbar swing into the expanded configuration and coupled to each folding panel.

The assembly next includes a rear crossbar member 90, configured to attach to an aft or rear portion of the truck cargo bed proximate the tailgate. The rear crossbar member includes left and right legs 92, 94, an upper crossbar 96, left and right angled braces 98, 100, and left and right upper and lower latch mechanisms, preferably spring-loaded barrel bolts 102a, 102b, 102c, 102d, which engage left and right folding panel upper and lower latching tabs/ramped strike plates 104a, 104b, and 106a, 106b to lock the crossbar member between and onto left and right folding panels 12, 40, as seen in FIG. 5B.

While not shown, each of the front and rear crossbar members may have mesh, solid panels, rigid, or flexible material disposed between the left and right legs so as to complete an enclosure between the generally upright folding panels, the truck cab and front crossbar member, and the rear crossbar member.

As can be seen, with the two folding panels secured in an upright position, and with the front and rear crossbar supports in place—thus realizing the expanded cargo bed configuration—the cargo bed container volume is substantially expanded; indeed, the interior volume is effectively doubled.

Figure 6A:
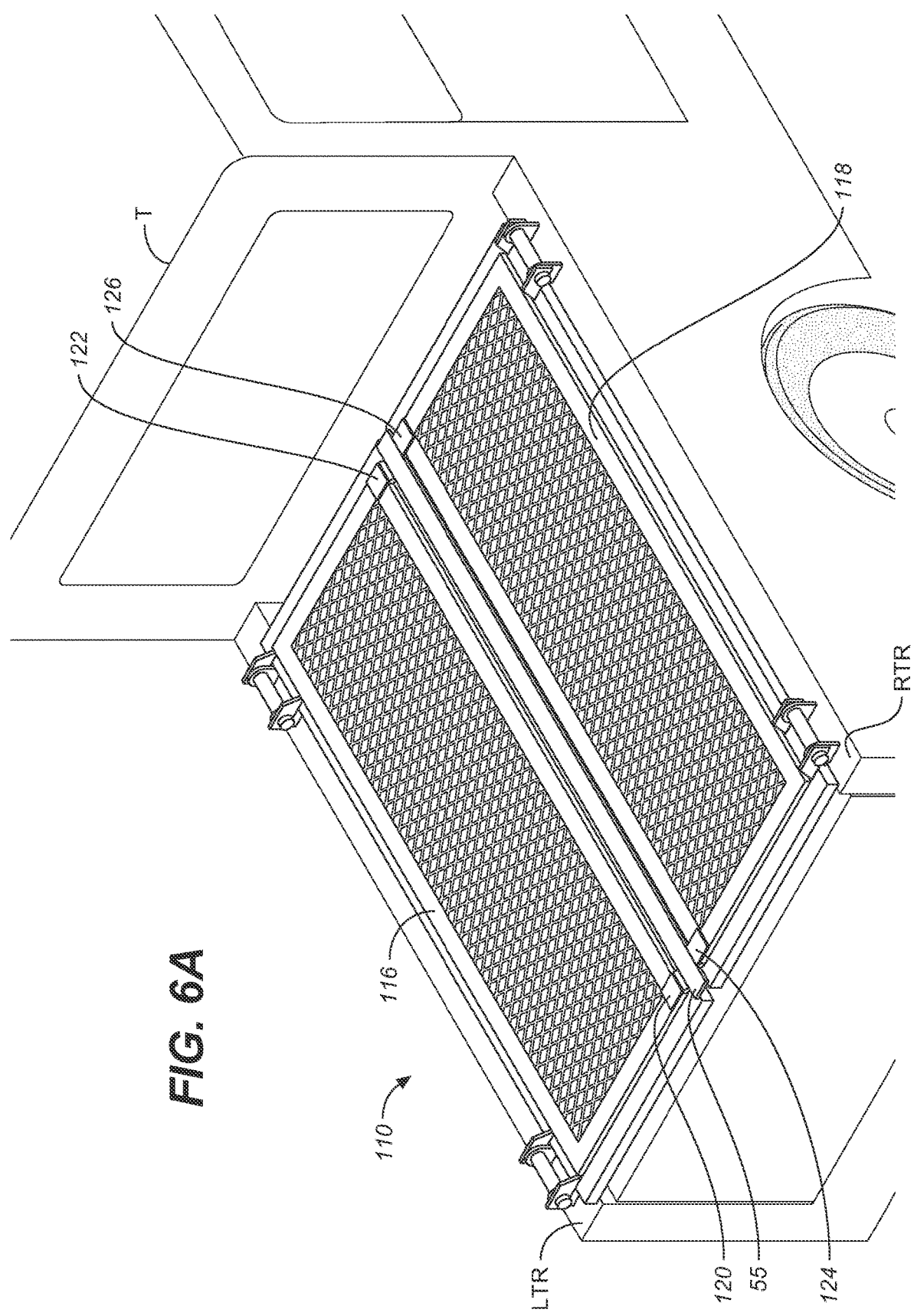
FIG. 6A is an upper right rear perspective view of an alternative embodiment of the folding bi-panel cargo bed and rack of the present invention.
Figure 6B:
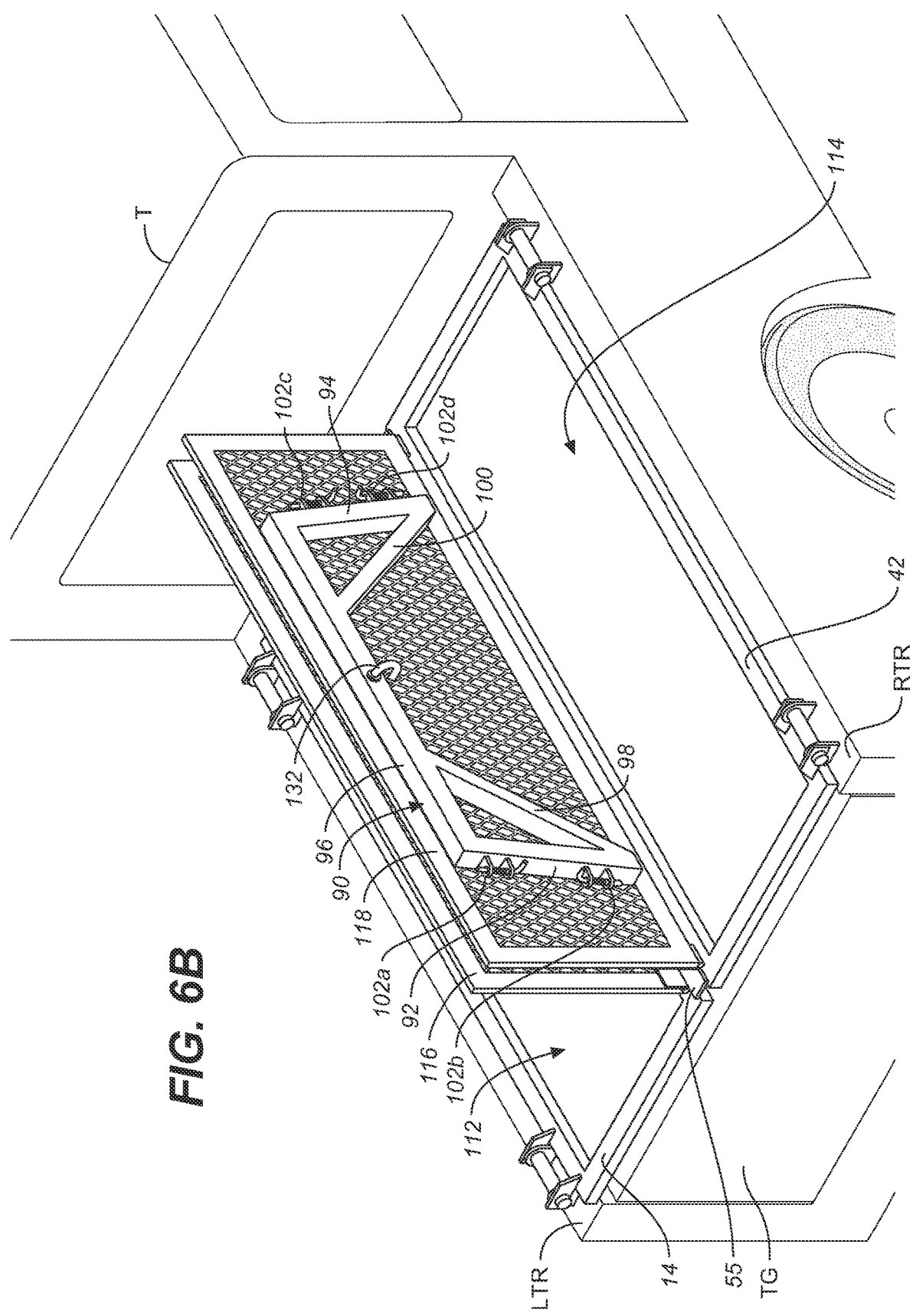
FIG. 6B is the same view showing folding panel doors opened to provide access to the truck cargo bed.
Figure 7A:
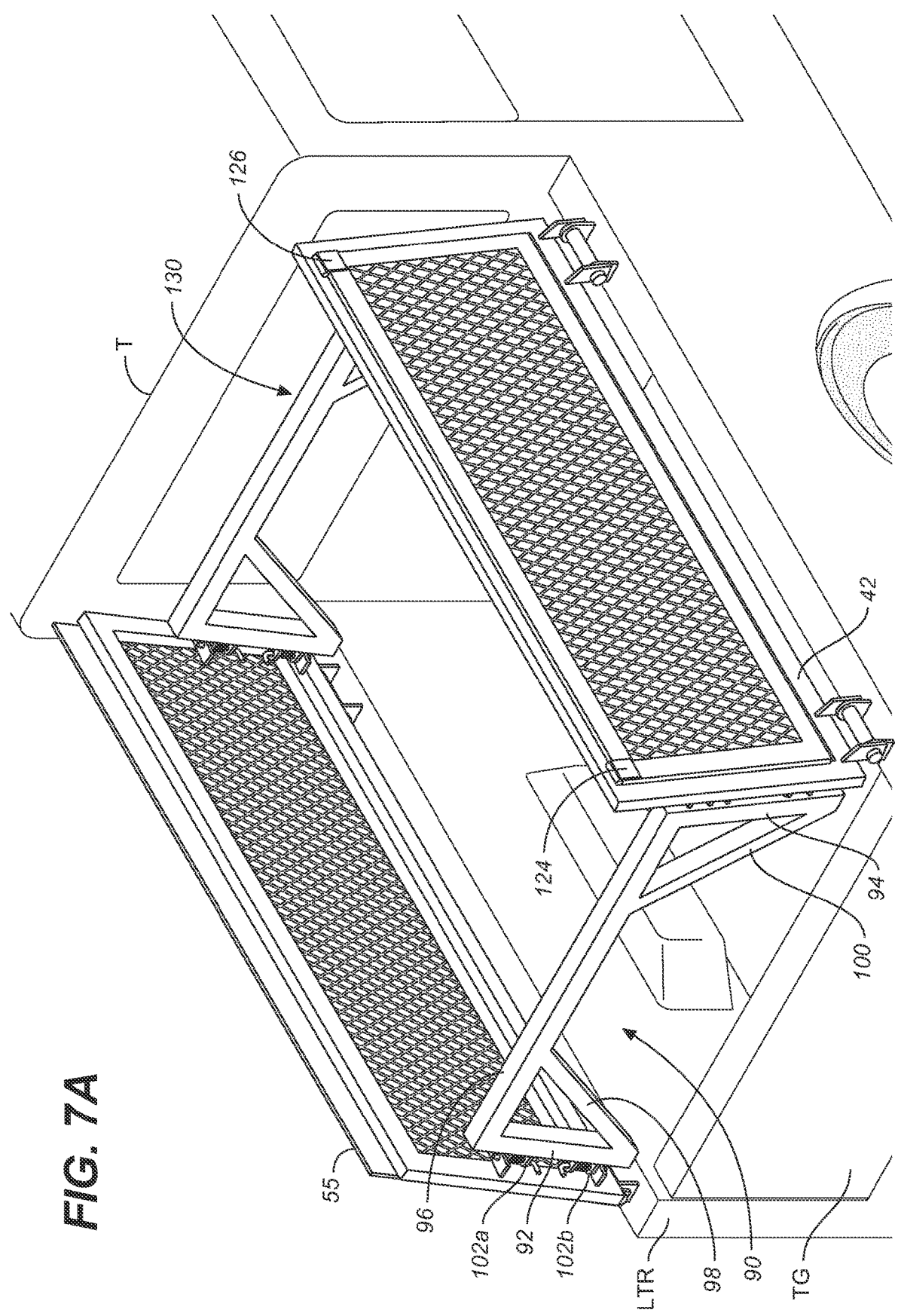
FIG. 7A is again the same view showing the folding bi-panels in the upright and expanded storage compartment configuration, secured with front and rear crossbars, and with the panel doors in the closed position.

Looking next at FIGS. 6A-7B, in another embodiment 110, the rectangular region 112, 114 between the frame rails of each of the folding panels may be selectively opened or closed when provided with hinged panel doors 116, 118 pivotally attached to the medial rail by left and right panel door hinges 120, 122, and 124, 126, respectively. This enables a user to selectively open the doors in both the storage and upright configurations. FIG. 6A shows the doors closed when the folding panels are in the cargo storage configuration and FIG. 6B shows the doors open when the folding panels are in the storage configuration; FIG. 7A shows the doors closed with the folding panels in the upright/expanded configuration, and FIG. 7B shows the doors open with the folding panels in the same upright/expanded configuration.

As will be appreciated, the doors may comprise metal mesh or solid panel material. They may further include conventional locking structure (such as padlock structures or keyed locks), so that the panel doors can be locked to the lateral rails or front or rear rails, or some combination thereof. Such structures are so well known as to obviate any need for illustration.

As can be seen in these views, in this embodiment the structural and operational elements of the left and right panels are identical to those in the embodiment shown in FIGS. 1-5B. However, when the folding panels are provided with panel doors, the hinged panel doors can be lifted off the plane of the panel frame for a user to gain access to the cargo bed interior when in either the storage or expanded configurations.

In embodiments, a fixed headache rack may be replaced with a front hinged crossbar 130 having essentially identical structure to that of the rear pivoting crossbar 90. The front rails are modified accordingly to provide structure to cooperate with spring-loaded barrel bolt latches earlier described. Again, such latches are non-limiting, inasmuch as a number of operationally comparable structures would be suitable and are known to those with skill in the art.

In further embodiments, both of the front and rear crossbars 90, 130, may either be removed entirely and stowed in the bed of the truck or, alternatively, a single side of the spring-loaded bolt latches may be uncoupled, enabling the crossbar to be pivoted or swung into contact with the inner side of the folding panel, and then captured and secured in a stored configuration by a clamp, such as a robust spring clamp or a threaded rod clamp 132. Clamping structures are well-known and the recitation to a specific device is therefore not needed, and any specific recitation herein is non-limiting. Rather, the clamp should be understood to be means to achieve the function of securing the crossbar against the interior side of the folding panel.

From the foregoing it can be seen that in its most essential aspect, the present invention is a cargo bed cover and rack for a pick-up truck cargo bed, including left and right folding panels having hinges configured to attach to the top rails of a pick-up truck cargo bed, a front crossbar member configured to attach to a fore portion of the truck cargo bed immediately behind the truck cab, a rear crossbar member configured to attach to a rear portion of the truck cargo bed proximate the tail gate, and latching mechanism disposed on the left and right folding panels configured to secure and selectively lock the panels in a cargo compartment storage configuration, and locking structure on at least one of the crossbar members that cooperate with the latching mechanisms to lock the folding panels in a generally upright position to achieve an expanded cargo compartment configuration.

Stated slightly differently, in another aspect the present invention may be characterized as a cargo bed cover and rack suitable for installation on and use with pick-up trucks with a conventional cargo bed. The assembly comprises two folding panels mounted on hinges on the right and left top rails of the cargo bed such that they fold inwardly to meet at the effective longitudinal center line of the plane formed when the planes of the flat panels are in substantially a horizontal orientation. Each panel covers half or nearly half of the open cargo bed, or the region defined by the left- and right-side panels, the tail gate, and the front panel of the cargo bed. The folding panels may be locked in that cargo bed storage configuration. They may then be unlocked to pivot on their hinges into a generally upright orientation, where they may be captured and locked into position on locking elements on a front headache rack (or front crossbar member) and rear crossbar member. In this configuration, the panels expand the cargo storage space substantially, as the panels act to nearly or entirely double the height of the truck's cargo bed sidewall panels.

The above disclosure is sufficient to enable one of ordinary skill in the art to practice the invention and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes, and equivalents will readily occur to those skilled in the art and may be employed, as suitable, without departing from the true spirit and scope of the invention. Such changes might involve alternative materials, components, structural arrangements, sizes, shapes, forms, functions, operational features, or the like.

Therefore, the above description and illustrations should not be construed as limiting the scope of the invention, which is defined by the appended claims.

What is claimed as invention is:

1. A cargo bed cover and rack for a pick-up truck cargo bed, comprising:
   a left folding panel having hinges configured to attach to a left top rail of the pick-up truck cargo bed;
   a right folding panel having hinges configured to attach to a right top rail of the pick-up truck cargo bed;
   a front crossbar member configured to attach to a fore portion of the truck cargo bed immediately behind the truck cab;
   a rear crossbar member configured to attach to a rear portion of the truck cargo bed proximate a tailgate;
   a latching mechanism disposed on each of said left and right folding panels configured to secure and selectively lock the panels in a cargo compartment storage configuration, wherein said panels are disposed in a substantially horizontal orientation; and
   locking elements on at least one of said front crossbar member or said rear crossbar member that cooperate with said latching mechanism on each of said left and right folding panels to lock the panels in a generally upright position to achieve an expanded cargo compartment configuration.

2. The cargo bed cover and rack of claim 1, wherein said rear crossbar member is pivotally attached to one of said right or left folding panels.

3. The cargo bed cover and rack of claim 1, wherein each of said right and left folding panels include a metal frame having rails that define an open interior region.

4. The cargo bed cover and rack of claim 3, wherein said open interior region of said right and left folding panels is covered with a material panel.

5. The cargo bed cover and rack of claim 4, wherein each of said material panels of each of said right and left folding panels includes hinges and is pivotally and removably attached to said metal frame, and further wherein said material panel may be opened when cargo bed cover and rack is in either the cargo compartment storage configuration or the expanded cargo compartment configuration.

6. The cargo bed cover and rack of claim 5, wherein said material panel is a solid non-mesh panel.

7. The cargo bed cover and rack of claim 5, wherein said material panel is made from a metal mesh material.

8. The cargo bed cover and rack of claim 1, wherein said front and rear crossbar members include a metal frame defining an open interior region.

9. The cargo bed cover and rack of claim 8, wherein said open interior region of said front and rear crossbar members is covered with a panel material.

10. The cargo bed cover and rack of claim 9, wherein said open interior region of said front and rear crossbar members is covered with a mesh material.

11. The cargo bed cover and rack of claim 1, wherein each of said front and rear crossbar members is pivotally attached to one of said right or left folding panels.

12. A pick-up truck rack and cargo bed cover, comprising:
    left and right folding panels, each including a lateral rail, a front rail, a rear rail, and a medial rail;
    front and rear hinges disposed on each of said lateral rails configured for mounting on a left top rail and right top rail, respectively, of a pick-up truck bed panel;
    a latching mechanism affixed to each of said front rails and rear rails;
    a front crossbar member having right and left vertical supports and at least one crossbar disposed therebetween, said front crossbar member configured to attach to said left and right folding panels either forward of or between said front rails and having a locking structure that cooperates with said latching mechanisms to secure said left and right folding panels in a generally upright orientation; and
    a rear crossbar member having right and left vertical supports and a crossbar disposed therebetween, said rear crossbar member configured to attach to a rear portion of the pick-up truck cargo bed and having latching mechanisms that cooperate with said latching mechanisms on said rear rails of said right and left folding panels to secure said left and right folding panels in a generally upright orientation;
    wherein said pick-up truck rack and cargo bed cover has a closed cargo bed cover configuration in which said left and right panels are generally horizontally disposed, and an expanded and open cargo storage compartment configuration in which said right and left folding panels are rotated on said hinges into a generally upright orientation and locked in place using said latching mechanisms and said locking structure.

13. The pick-up truck rack and cargo bed cover of claim 12, wherein said latching mechanism includes a spring-loaded barrel bolt having a locking pin slidingly disposed between spaced-apart integral tabs with aligned bolt holes.

14. The pick-up truck rack and cargo bed cover of claim 13, wherein said locking structure on said front crossbar member is a ramped strike plate secured to each of said vertical supports.

15. The pick-up truck and cargo bed cover of claim 13, wherein said rear crossbar member is pivotally attached to one of said right or left folding panels and has a storage configuration in which it may be secured against a folding panel in a generally horizontal orientation when said folding panel is in a generally horizontal orientation and pivots into an expanded storage compartment configuration and couples to and between said rear rails of each of said left and right folding panels.

16. The pick-up truck and cargo bed cover of claim 15, wherein said front crossbar member is pivotally attached to one of said right or left folding panels and has a storage configuration in which it may be secured against a folding panel in a generally horizontal orientation when said folding panel is in a generally horizontal orientation and pivots into an expanded storage compartment configuration and couples to and between said front rails of each of said left and right folding panels.

17. The pick-up truck and cargo bed cover of claim 12, wherein said front crossbar member is configured as a headache rack for attachment to the top rail of a front panel of the pick-up truck cargo bed.

18. The pick-up truck rack and cargo bed cover of claim 12, wherein said rails of each of said left and right folding panels define an area covered with a panel material.

19. The pick-up truck rack and cargo bed cover of claim 18, wherein said panel material is a mesh screen.

20. The pick-up truck rack and cargo bed cover of claim 18, wherein said panel material is a non-mesh solid material.

\* \* \* \* \*